Feb. 20, 1962 C. W. GROVE-WHITE 3,022,422
CONTINUOUSLY OPERATING ANALYTICAL INSTRUMENTS
Filed Nov. 6, 1957 4 Sheets-Sheet 4

Inventor
C. W. Grove-White
By Glascock Downing Seebold
Attys.

United States Patent Office 3,022,422
Patented Feb. 20, 1962

3,022,422
CONTINUOUSLY OPERATING ANALYTICAL INSTRUMENTS
Charles W. Grove-White, Brynddu, Llanfechell, Anglesey, Wales, assignor to Fielden Electronics Limited, Wythenshawe, Manchester, Lancashire, England, a British company
Filed Nov. 6, 1957, Ser. No. 694,787
Claims priority, application Great Britain Nov. 8, 1956
6 Claims. (Cl. 250—43.5)

This invention relates to apparatus for performing quantitative analysis and, in particular, to apparatus of this kind which is suitable for continuous operation.

Apparatus for performing quantitative analysis is known in which a suitable radiation is transmitted in two beams one of which contains a material under test and the other of which contains a reference material, the quantity of radiation transmitted in the two beams being adjusted to equality by means of a movable opaque shutter interposed in one beam, the extent to which the shutter is moved being used as a measure of the difference in the absorption occurring in the two beams, and therefore, as an indication of the composition of the material under test.

This known arrangement has the disadvantage, however, that whereas the difference in the absorption of radiation occurring in the two beams is due to the differing degrees to which certain wavelengths only are absorbed; the equalising of the radiation transmitted in the two beams is attained by varying the amount of radiation passing through one path regardless of wavelength. The known apparatus thus, in effect, balances quantities of different kinds and there is, therefore, always some uncertainty as to whether or not the balance is a true one. Furthermore, the known apparatus has been found to be subject to a drift and the indications are that this drift is the result of reliance having to be placed upon the apparent balancing of quantities of different kinds.

An object of the invention is to provide apparatus of improved stability.

According to one aspect of the invention apparatus for performing quantitative analysis by transmitting a suitable radiation in two beams in one of which is material under test and in the other of which is reference material containing a substance the proportion of which in the material under test is to be estimated and determining the difference between the radiations emerging from the two beams due to differences in adsorption in the two beams by said substance to be estimated, feedback means being provided to equalise the radiations being compared by adjusting the amount of substance to be estimated in one or other of said beams.

According to another feature of the invention apparatus for performing quantitative analysis by transmitting a suitable radiation in three beams of which the first and second contain equal amounts of a material under test and the second includes means for absorbing all radiation capable of being absorbed by a substance the proportion of which in the material under test is to be estimated and determining the difference between the radiation emerging from the first beam and the sum of the radiations emerging from the second and third beams due to absorption in the first beam by said substance to be estimated feedback means being provided to equalise the radiations being compared by adjusting the amount of substance to be estimated in the third beam.

Several embodiments of the invention will now be described by way of example with reference to the accompanying drawings, of which:

In the various figures corresponding elements are indicated by the same reference numeral.

Figure 1:
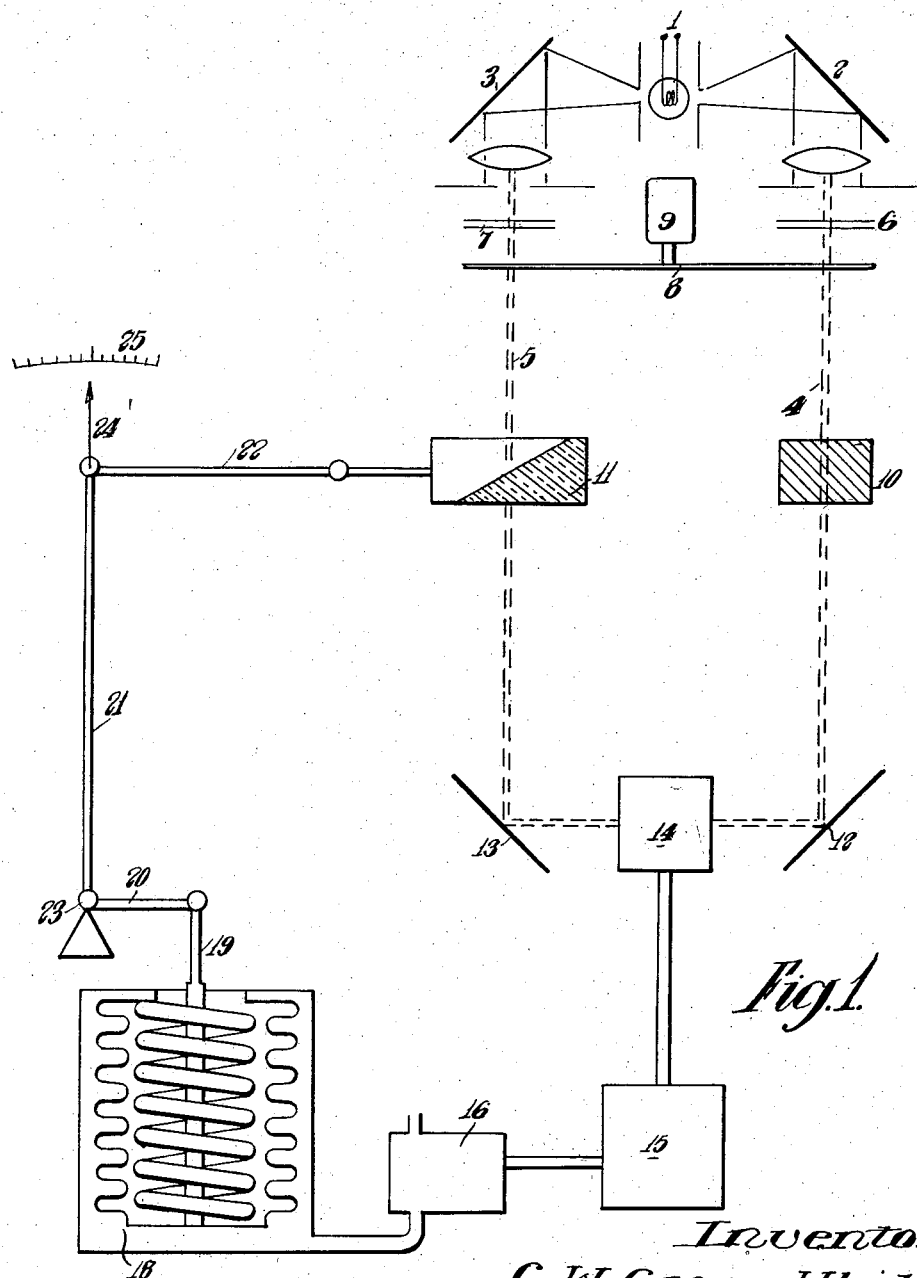
FIGURE 1 shows a two-beam apparatus suitable for the analysis of a continuous strip of solid material.

In the arrangement shown in FIGURE 1, ultraviolet radiation from a source 1 is collimated by conventional collimator systems 2 and 3 into two beams 4 and 5. One or more filters may be inserted in both beams at positions indicated by reference numerals 6 and 7 in order to limit the radiation to the wavelength range in which absorption occurs and thus to increase sensitivity. The beams 4 and 5 are chopped in phase by a chopper 8 driven by a synchronous motor 9.

The sample beam 4 passes through a continuous strip sample 10 of the material to be analysed which may, for example, consist of the substance to be estimated and one other substance only. This sample strip is of constant cross section and is fed continuously through the apparatus in a direction perpendicular to the plane of the figure.

The reference beam 5 passes through a feed-back block 11 consisting of two wedges one of which is composed entirely of the substance to be estimated and the other of which consists entirely of the other substance in the sample. The thickness of the block 11 is equal to that of the strip 10 in order to ensure optical symmetry of the two paths and to ensure that the maximum and minimum amounts of substance to be estimated which can be introduced into the beam 5 are respectively greater and less than the maximum and minimum amounts to be encountered in the sample. Movement of the block in a direction from left to right as shown in the drawing or vice versa permits the amount of substance to be estimated interposed in the beam 5 to be varied by an amount which varies linearly with the movement of the block.

After passing through the strip 10 and block 11 respectively the beams 4 and 5 are deflected by mirrors 12 and 13 respectively to a detector 14 of known kind which detects any difference between the radiation emerging from the two beams due to absorption by the substance to be estimated and which is preferably specific for the absorption bands of that substance to be estimated.

The detector 14 produces an electrical signal dependent upon the difference in the radiation emerging from the two beams 4 and 5 and this signal is amplified by the high gain amplifier 15 the output of which is applied to an electro-pneumatic converter 16 of known kind which provides an air pressure proportional to the electrical signal supplied to it. This air pressure compresses a spring loaded bellows 18 which is coupled to the block 11 by links, 19, 20, 21 and 22. The links 20 and 21 form a bell crank lever which pivots about a fixed pivot 23. Movement of the bellows 18 is thus transmitted through the linkage to the block 11, the movement of the latter being such as to equalise the radiation emerging from the beams 4 and 5. The detector-amplifier system is arranged in known manner to discriminate between the two beams 4 and 5 and thus to move the block 11 always in the direction to equalise the radiations emerging from the two beams.

Thus a control loop is set up which maintains equality between the amounts of the substance to be estimated in the two beams. A pointer 24 moving over a scale 25 indicates the magnitude of the movement of the block 11 and, since the amount of material to be estimated which is interposed in the beam 5 varies linearly with the position of the block 11, the scale 25 may be calibrated to read directly the proportion of the substance to be estimated in the sample strip 10.

Alternatively, the block 11 may be moved by means of a spring loaded piston co-acting with a cylinder supplied with air under pressure from the convertor 16.

Figure 2:
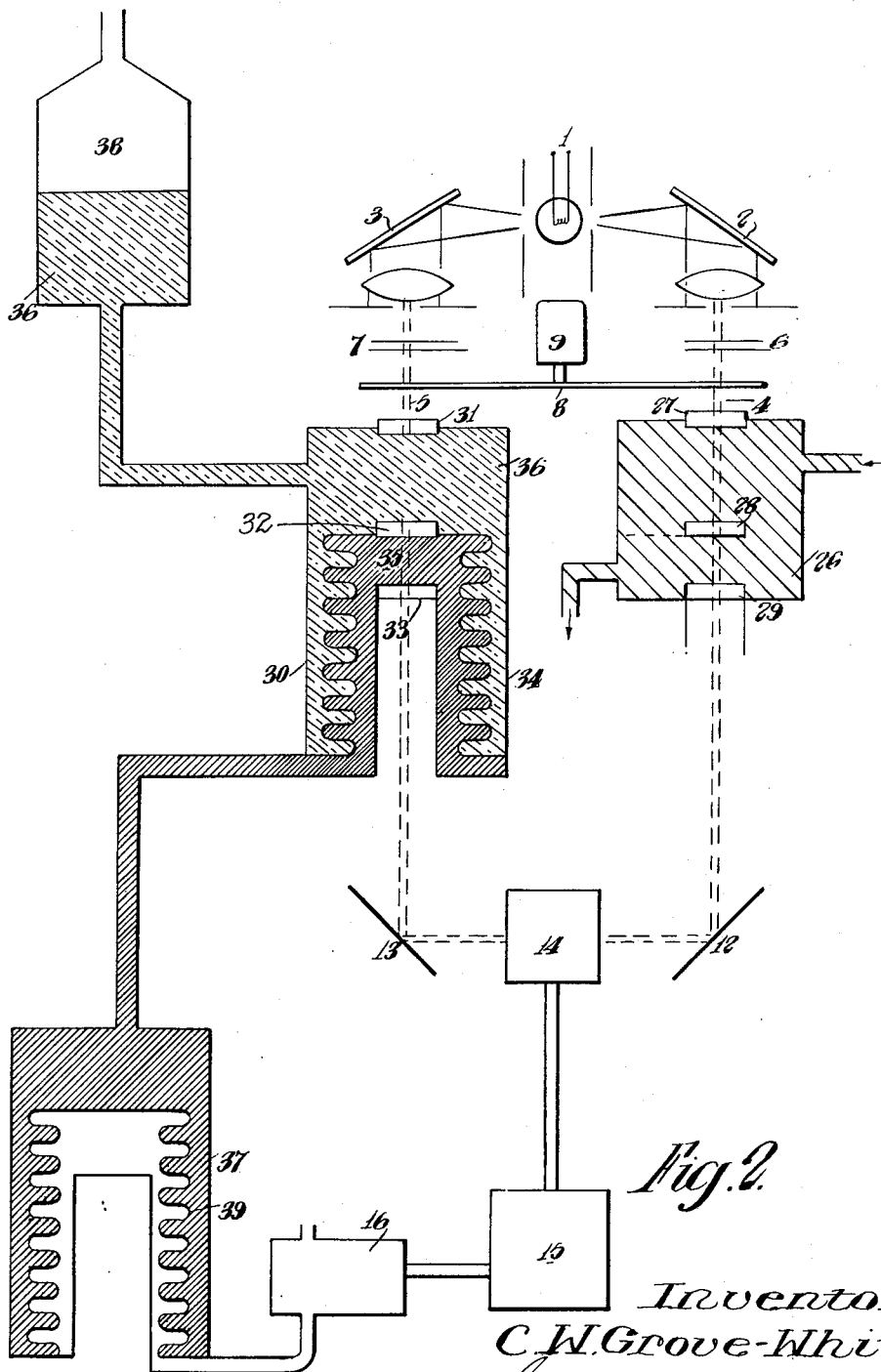
FIGURE 2 shows a two-beam apparatus suitable for the analysis of a liquid stream.

In the arrangement shown in FIGURE 2 visible radiation from a source 1 is collimated by conventional collimator systems 2 and 3 into two beams 4 and 5, the beams passing through filters 6 and 7 respectively and being chopped by a chopper 8 driven by a synchronous motor 9.

A liquid sample which may for simplicity consist of a single solute dissolved in a single solvent flows through a sample cell 26 interposed in the sample beam 4. The cell 26 is provided with three transparent windows 27, 28, and 29, the window 28 being provided for the reason set forth below.

The reference beam 5 passes through a feed-back cell 30 of the same optical length as the cell 26, the cell 30 having three windows 31, 32 and 33, the window 32 being sealed to one end of the bellows 34 contained within the cell 30 so that it divides the path traversed by the beam 5 through the cell 30 into two portions the relative lengths of which may be varied without changing the total length. The window 28 is inserted in the cell 26 in order to simulate in the path of the beam 4 the optical effect of the window 32 in the path of the beam 5. The lower portion of the cell 30, that is, the portion of the cell 30 beneath the window 32 is filled with a first standard solution 35 of the solvent in the solute and the upper portion, that is, the portion of the cell 30 above the window 32 is filled with a second standard solution 36 of the solute in the solvent, the strength of the first standard solution being greater than the maximum strength to be encountered in the liquid sample and the strength of the second standard solution being less than the minimum strength to be encountered in the liquid sample.

The lower portion of the cell 30 is in communication with a bellows chamber 37 and the upper portion of the cell 30 is in communication with a reservoir 38.

After passing through the cells 26 and 30 respectively the beams 4 and 5 are deflected by mirrors 12 and 13 respectively to a detector 14 of known kind which detects any difference between the radiation emerging from the two beams due to absorption by the substance to be estimated and which is preferably specific for the absorption bands of the substance to be estimated.

The detector 14 produces an electrical signal dependent upon the difference in the radiation emerging from the two beams 4 and 5 and this signal is amplified by a high gain amplifier 15 the output of which is applied to an electro-pneumatic converter 16 of known kind which provides an air pressure proportional to the electrical signal supplied to it. Variation of this air pressure compresses or expands a bellows 39 and so cause a decrease or increase of the amount of the standard solution 35 contained in the lower portion of the cell 30 and a corresponding increase or decrease respectively of the amount of the standard solution 36 contained in the upper portion of the cell 30. The detector-amplifier system is again arranged in known manner to discriminate between the two beams 4 and 5 and thus to cause a change in the cell 30 which is always in the direction to equalise the radiations emerging from the two beams 4 and 5. Thus a control loop is set up which maintains equality between the amounts of the substance to be estimated in the two beams 4 and 5. The proportion of solute in the reference beam 5 is determined by the relative proportion of standard solutions 35 and 36 through which the beam 5 passes and this may be ascertained most simply by measuring the level of the solution 36 in the reservoir 38. This measurement will, therefore, indicate the proportion of the solute in the sample solution.

Figure 3:
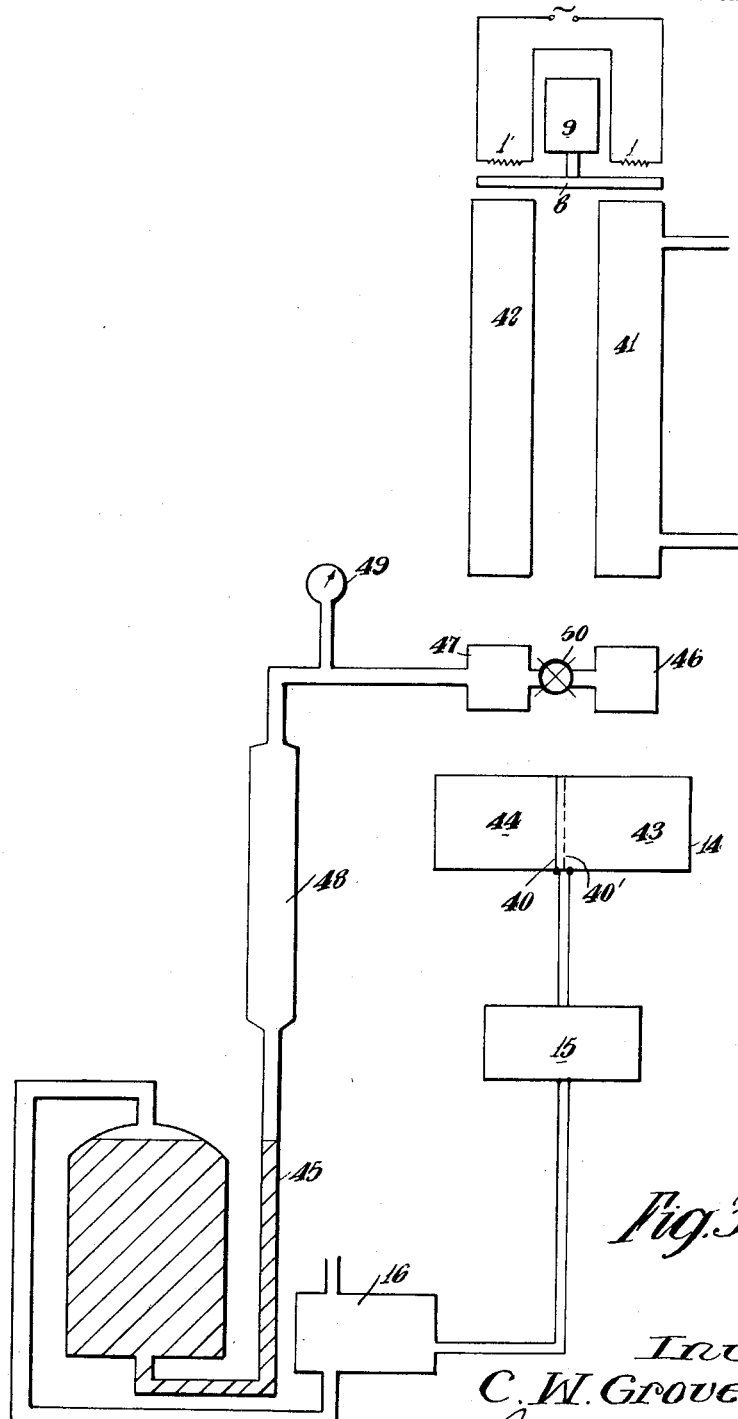
FIGURE 3 shows a two-beam apparatus suitable for the analysis of a gaseous stream.

In the arrangement shown in FIGURE 3 the invention is applied to a conventional Luft type non-dispersive infra-red gas analyser having black-body radiators 1 and 1', chopper 8 driven by synchronous motor 9, sample cell 41 containing the gas sample to be analysed, reference cell 42 containing a reference gas, having no infra-red absorption, and a detector 14 having two chambers 43 and 44 separated by a flexible metal diaphragm 40. The two chambers 43 and 44 are filled with the gas the proportion of which in the sample gas is to be estimated. The arrangement is such that all infra-red energy incident upon the chambers 43 and 44 and falling within the absorption bands of the gas to be estimated is absorbed in those chambers. As a result of this absorption the gas contained in the chambers becomes heated and its pressure consequently rises. Any difference between the quantity of energy absorbed in the two chambers 43 and 44 therefore causes the diaphragm 40 to deform and consequently causes the capacitance between the diaphragm 40 and an insulated perforated metal plate 40' to vary. If both the sample cell 41 and the reference cell 42 contain gas having no infra-red absorption and the chopper admits radiation simultaneously to these two cells the pressure pulses in the two chambers 43 and 44 will balance and no movement of the diaphragm will result. If, on the other hand, a proportion of gas to be estimated is contained in the sample gas in the cell 41 some at least of the radiation passing into the sample gas will be absorbed before it reaches the chamber 43. The balance of pressure will then be upset and the diaphragm 40 will vibrate at the frequency of chopping. The change of potential occuring on the plate 40' as a result of this vibration is amplified by means of the high gain amplifier 15 the output of which is applied to a meter (not shown) calibrated to read directly the proportion of gas to be estimated in the gas under test.

In applying the invention to this known type of analyser the output of the amplifier 15 is applied to an electro-fluid converter 16 of known kind which provides an air pressure proportional to the electrical signal supplied to it. This pressure is applied to one limb of a U-tube 45 the other limb of which communicates with a feed-back cell 47 via a reservoir 48. The feed-back cell 47 and reservoir 48 are filled with the gas to be estimated either alone or mixed with a non-absorbent gas. Variation of the pressure provided by the converter 16 causes variation in the pressure in the feed-back cell 47 and this pressure is indicated on the gauge 49. The detector-amplifier system is arranged in known manner to discriminate between the two beams of radiation falling upon the detector chambers 43 and 44 respectively and thus to vary the pressure in the feed-back cell 47 always in the direction to equalise the radiation in the two beams.

Thus a control loop is set up which maintains equality between the amounts to be estimated in the two beams of radiation reaching the detector 14. Since the quantity of gas to be estimated which is interposed in the reference beam varies linearly with the pressure indicated by the gauge 49, this gauge may be calibrated to read directly the proportion of the gas to be estimated in the sample gas if the pressure of the sample gas is maintained constant. The linearity may be affected by possible second order pressure broadening effects on gas absorption spectra in certain cases.

The range of concentration of gas to be estimated over which the apparatus will operate satisfactorily may be varied by diluting the gas to be estimated in the feed-back chamber 47 with a non-absorbent gas. A balance chamber 46, optically similar to the cell 47, is interposed in the sample beam and may be connected to the feed-back cell 47 through a tap 50. By opening the tap 50 and equalising the pressures in the feed-back and balance cells when the pressure in the former cell is at its lowest possible value, closing the tap and thereafter maintaining the feed-back and balance cells at the same temperature, the apparatus may be arranged to give a zero reading.

In each of the arrangements described above equality of absorption in the two beams is attained by varying the amount of substance to be estimated which is interposed in the reference beam. By means of a simple modification of these arrangements the amount of substance to be estimated which is interposed in the reference beam may be mainained constant at a value greater than that to be encountered in the sample and the amount of substance to be estimated interposed in the sample beam may be increased by feed-back means similar to those described above until equality of absorption of the two beams is attained. An indicating device associated with the feed-back means will then indicate a deficit of substance to be estimated compared with the amount present in the reference beam.

In the arrangement shown in FIGURE 1 the two wedges of which the feed-back block is composed need not have a planar interface. Thus, by arranging that the amount of substance to be estimated which is traversed by the beam 5 varies non-linearly in the longitudinal dirction of the block 11 it is possible to expand or contract the scale 25 in any desired manner. It is necessary only that the amount of substance to be estimated which is present in any section of the block 11 shall be known and that this amount shall increase continuously in one longitudinal direction of the block. For example, for the purpose of analysing a strip of solid polymer the feed-back block may consist of a block of polymer the degree of polymerisation of which varies along the length of the block in a known manner. In a further modification the block 11 may be formed of two hollow wedge-shaped chambers with transparent windows, which chambers may, respectively, be filled with, for example, a solute and a solvent or a gas to be estimated and a non-absorbent gas.

In the arrangement shown in FIGURE 3 the U-tube may be replaced by a metal bellows enclosed in a cylinder, the exterior of the bellows being connected to the converter 16 and the interior of the bellows being connected to the feed-back cell 47 or vice versa. The interior of the bellows then acts as a gas reservoir and the reservoir indicated by the reference numeral 48 is preferably eliminated in order to increase the ratio of maximum and minimum pressures attainable in the feed-back cell. This ratio may be further increased by arranging that the interior of the bellows is partly occupied by a displacer. Alternatively, the interior of the bellows may be connected to the convertor 16 and the exterior of the bellows may be connected to the feed-back cell 47.

Figure 4:
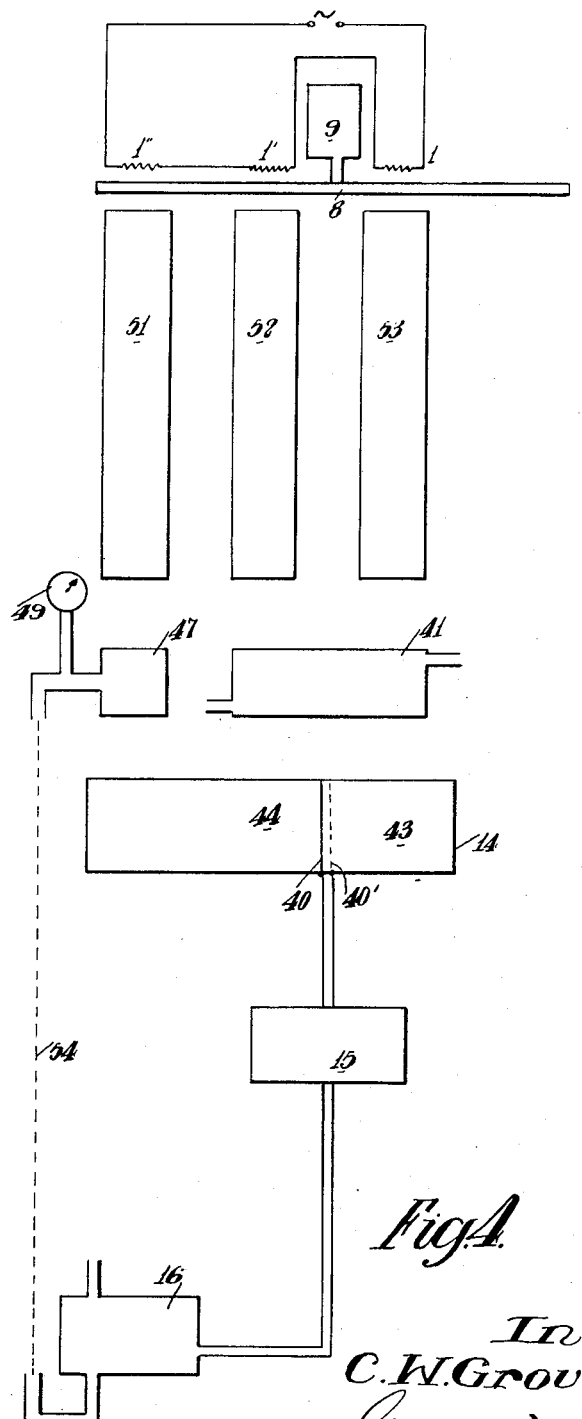
FIGURE 4 shows a three-beam apparatus suitable for the analysis of a gaseous stream.

In the arrangement shown in FIGURE 4 the invention is applied to a known form of three-beam gas analyser. In this arrangement infra-red radiation produced by a heater 1 is transmitted in a first beam first through a comparison cell 53 and then through a sample cell 41, infra-red radiation produced by a heater 1' is transmitted in a second beam first through a sensitising cell 52 and then through the above-mentioned sample cell 41 and infra-red radiation produced by a heater 1" is transmitted in a third beam first through a comparison cell 51 and then through a feed-back cell 47 containing the gas to be estimated. The three cells 51, 52 and 53 are optically identical. The cell 52 contains the gas to be estimated in sufficient quantity to absorb all radiation incident upon it which is capable of being absorbed by the gas to be estimated. The cells 51 and 53 contain non-absorbent gas and serve merely to render the paths through them optically identical with the path through the cell 52 in the absence from the latter of the gas to be estimated.

The gas to be analysed is passed through the sample cell 41. Radiation passing through the cells 53 and 41 in series is detected in the chamber 43 of the detector 14 and the total radiation passing through the cells 52 and 41 in series and the cells 51 and 47 in series is detected in the chamber 44 of the detector 14. The radiation produced by the three heaters is chopped synchronously and any inequality between the radiations being compared by the detector 14 produces an alternating voltage between the flexible diaphragm 40 and the insulated rigid plate 40'. This alternating voltage is amplified by the amplifier 15, converted to a corresponding air pressure by the electro-pneumatic converter 16 and the pressure of the gas to be estimated in the feed-back cell 47 is varied in dependence upon this air pressure in the manner described above with reference to FIGURE 3. This dependence of the gas pressure in the feed-back cell 47 upon the air pressure provided by the convertor 16 is indicated in the figure by the dotted line 54. If the amount of radiation entering each beam is the same the amount of gas to be estimated in the feedback cell 47 and, therefore, the pressure indicated by the gauge 49 is an indication of the proportion of gas to be estimated in the sample gas.

The arrangement shown in FIGURE 4 may be modified to render it suitable for performing analysis of solid or liquid samples and in that event the feedback means may, for example, take any one of the forms described above with reference to FIGURES 1 and 2.

The material under test has for simplicity of the above description, been assumed to consist of the substance to be estimated and one other substance, which other substance is non-absorbent. The term "non-absorbent" is intended to describe not only substances which absorb no incident radiation, but also substances which do absorb such radiation but which are, by their absorption, without effect upon the response of the detector 14. Clearly, more than one such substance may be present in the material under test without affecting the performance of the apparatus.

What is claimed is:

1. In apparatus for performing quantitative analysis having means for transmitting an undispersed radiation in a plurality of beams at least one of which passes through a body of sample material containing a substance to be estimated, the beams being incident upon a two-element detector means providing an electrical signal dependent upon the difference between the energies incident upon said two elements, said difference being dependent upon the absorption of said radiation by said substance in said body, equalizing means connected to the output of said detector means and operative to reduce said difference to zero by adjustment of the energy transmitted in a controlled one of said plurality of beams and means for measuring said adjustment; the improvement whereby said controlled beam passed through a further body of material containing said substance said further body being so controlled by said equalizing means in dependence upon said electrical signal that absorption by said substance in the path of said controlled beam within said further body is such as to reduce said difference to zero, said further body of material being such that the proportion of said substance in any transverse section increases continuously in one longitudinal direction through said further body, said controlled beam passing transversely through said further body, said equalizing means moving said further body longitudinally and said measuring means measuring the movement of said further body.

2. Apparatus according to claim 1 wherein said further body is composed of a solid polymer the degree of polymerisation of which increases in said one longitudinal direction.

3. Apparatus according to claim 1 wherein said further body is contained in two hollow wedge-shaped chambers one of which contains said substance and the other of which contains a non-absorbent substance.

4. In apparatus for performing quantitative analysis having means for transmitting an undispersed radiation in a plurality of beams at least one of which passes through a body of sample material containing a substance to be estimated, the beams being incident upon a two-element detector means providing an electrical signal dependent upon the difference between the energies incident upon said two elements, said difference being dependent upon the absorption of said radiation by said substance in said body, equalizing means connected to the output of said detector means and operative to reduce said difference to zero by adjustment of the energy transmitted in a controlled one of said plurality of beams and means for measuring said adjustment; the improvement whereby said controlled beam passed through a further body of material containing said substance said further body being so controlled by said equalizing means in dependence upon said electrical signal that absorption by said substance in the path of said controlled beam within said further body is such as to reduce said difference to zero, said further body being contained in a vessel divided into two chambers by a movable transparent window, said chambers being fully charged with solutions of different strengths of said substance in a non-absorbent solvent and being traversed in sequence by said controlled beam, said equalizing means displacing said window in a direction parallel to said controlled beam.

5. Apparatus according to claim 4 wherein each said chamber has communication with a corresponding reservoir and said equalising means displaces said window by applying to one said reservoir a pressure dependent upon said electrical signal to cause a corresponding flow of solution between each reservoir and the corresponding chamber.

6. In apparatus for performing quantitative analysis having means for transmitting an undispersed radiation in two beams one of which passes through a sample cell containing a gas to be estimated, both beams being incident upon detector means providing an electrical signal dependent upon the difference between the energies transmitted to the detector via said beams, said difference being dependent upon the absorption of said radiation by said substance in said body, equalising means connected to the output of said detector means and operative to reduce said difference to zero by adjustment of the energy reaching said detector via a controlled one of said beams and means for measuring said adjustment; the improvement whereby said controlled beam passes through a feedback cell containing said gas to be estimated and said equalising means controls the pressure in said feedback cell in dependence upon said electrical signal so that absorption by said gas in the path of said controlled beam within said feedback cell is such as to reduce said difference to zero and including a balancing cell, optically similar to said feedback cell interposed in the beam not traversing said feedback cell, said balancing cell containing said gas at a pressure equal to the minimum pressure obtainable in said feedback cell.

References Cited in the file of this patent
UNITED STATES PATENTS

| | | |
|---|---|---|
| 2,462,995 | Ritzmann | Mar. 1, 1949 |
| 2,547,212 | Jamison et al. | Apr. 3, 1951 |
| 2,579,825 | Hutchins | Dec. 25, 1951 |
| 2,688,090 | Woodhull | Aug. 31, 1954 |
| 2,739,478 | Offner | Mar. 27, 1956 |
| 2,764,536 | Hutchins | Sept. 25, 1956 |
| 2,769,919 | Crawford | Nov. 6, 1956 |
| 2,792,501 | Barton | May 14, 1957 |
| 2,806,957 | McDonald | Sept. 17, 1957 |
| 2,844,066 | Friel | July 22, 1958 |
| 2,844,729 | Winterling | July 22, 1958 |
| 2,866,900 | Busignies et al. | Dec. 30, 1958 |
| 2,875,340 | Liston | Feb. 24, 1959 |